G. S. Rice,
Spring Scale.
No. 104,499.    Patented June 21, 1870.

George S. Rice
by his attorney
A. Pollok

WITNESSES.

United States Patent Office.

GEORGE S. RICE, OF NEW YORK, N. Y., ASSIGNOR TO VULCANITE JEWELRY COMPANY.

Letters Patent No. 104,499, dated June 21, 1870.

IMPROVEMENT IN POCKET OR "CHARM" LETTER-SCALE.

The Schedule referred to in these Letters Patent and making part of the same

*To whom it may concern:*

Be it known that I, GEORGE S. RICE, of the city, county and State of New York, have invented a new and useful Pocket or Charm Letter-Scale, of which the following is a specification.

My invention consists of a scale for weighing letters, constructed substantially as hereinafter described, so that it may be hung on the watch-chain or guard as a "charm," being not only useful as a convenient device for weighing letters, but also ornamental as an article of jewelry.

To enable those skilled in the art to understand and use my invention, I will now proceed to describe the manner in which the same is or may be carried into effect, by reference to the accompanying drawing, in which—

The body of the scale, shown at $a$, is made of cylindrical or other suitable form, and is provided with a head or cap, $b$, from which are suspended the weighing devices. Both the body and the head, in this instance, are made of hard rubber or "vulcanite," but they may be made of gold, silver, or other material suitable for the purpose and used in the manufacture of jewelry.

The body or cylinder $a$ is slotted on one side at $c$, and adjoining the slot is formed a scale of ounces. This scale, for greater convenience, is made upon a plane surface, cut or otherwise formed in the cylindrical casing on either or both sides of the slot.

Figure 1:
Figure 1 is a perspective view of the letter-scale, made in accordance with my invention.
Figure 2:
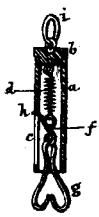
Figure 2 is a longitudinal central section of the same.

From the head $b$ is suspended a fine spiral spring, $d$, fastened to a ring or hook inserted in the head, and the lower end of the spring is secured to a wire connecting-piece, $f$, bent, as shown in fig. 2, so as to form a loop to receive the end of the spring, a loop to hold the spring letter-clasp $g$, and an indicator or pointer, shown at $h$, which projects through the slot $c$, and serves, in conjunction with the scale, to indicate the weight of the letter held by the spring clasp $g$. This clasp, the upper part of which is held in the lower loop of the connecting-piece $f$, is formed of wire or a thin metallic spring strip, formed as shown in the drawing, and having its two ends bent and curved inwardly, so as to form yielding spring jaws, which will clasp and hold the letter or other article slipped between them. The construction of the index or pointer, and of the device for connecting the letter-holding clip, and the spring from which it is suspended, may be varied, if desired, though I prefer the construction just described.

On top of the head or cap $b$ is secured a ring, $i$, by which the scale may be attached to the chain or ribbon by which it is held.

The pocket or "charm" letter-scale thus made is of but little size, for it need not be more than an inch in length, is ornamented, and may be attached as a "charm" to the watch-guard or chain, where it will always be conveniently at hand for use.

The scale may also be safely carried in the pocket, the heart-shaped formation of the letter-holding spring, caused by the turning in of its ends, allowing it to be thus carried or exposed on the watch-chain, or otherwise, without danger of breaking it, or of piercing or injuring the clothing.

Having now described my invention, and the manner in which the same is or may be carried into effect,

What I claim, and desire to secure by Letters Patent, is—

A pocket or charm letter-scale, composed of a slotted casing, an index or pointer, and a heart shaped letter-holding spring suspended from a spring within the casing, said parts being arranged for joint operation, substantially as shown and described.

In testimony whereof I have signed my name to this specification before two subscribing witnesses.

GEO. S. RICE.

Witnesses:
   HENRY L. FULLER,
   A. P. PITCHER.